United States Patent
Fox et al.

(10) Patent No.: US 9,497,247 B2
(45) Date of Patent: Nov. 15, 2016

(54) TRANSFERRING SESSION STATE INFORMATION BETWEEN TWO OR MORE WEB-BASED APPLICATIONS OF A SERVER SYSTEM

(75) Inventors: Gregory A. Fox, Oak Point, TX (US); Timothy T. Tye, Wylie, TX (US)

(73) Assignee: CA, Inc., New York, NY (US)

( * ) Notice: Subject to any disclaimer, the term of this patent is extended or adjusted under 35 U.S.C. 154(b) by 1699 days.

(21) Appl. No.: 11/559,594

(22) Filed: Nov. 14, 2006

(65) Prior Publication Data

US 2007/0208862 A1  Sep. 6, 2007

Related U.S. Application Data

(60) Provisional application No. 60/779,615, filed on Mar. 6, 2006.

(51) Int. Cl.
*G06F 15/16* (2006.01)
*H04L 29/08* (2006.01)

(52) U.S. Cl.
CPC .............. *H04L 67/02* (2013.01); *H04L 67/14* (2013.01); *H04L 67/142* (2013.01); *H04L 67/148* (2013.01)

(58) Field of Classification Search
USPC ........................... 709/227–229; 719/313–316
See application file for complete search history.

(56) References Cited

U.S. PATENT DOCUMENTS

| | | | | |
|---|---|---|---|---|
| 6,041,357 | A * | 3/2000 | Kunzelman et al. | 709/228 |
| 6,640,249 | B1 * | 10/2003 | Bowman-Amuah | G06F 8/38 709/228 |
| 6,938,085 | B1 * | 8/2005 | Belkin | G06F 9/5055 709/213 |
| 7,433,956 | B2 * | 10/2008 | Zhao | H04L 29/06 709/227 |
| 7,533,261 | B2 * | 5/2009 | Dharmarajan | H04L 63/0428 709/227 |
| 7,543,069 | B2 * | 6/2009 | Hasti | H04L 67/1034 709/217 |
| 7,552,219 | B2 * | 6/2009 | Polozoff | H04L 65/1066 709/217 |
| 7,600,232 | B2 * | 10/2009 | Hunt | G06F 9/546 719/313 |
| 7,689,710 | B2 * | 3/2010 | Tang | H04L 29/06 709/222 |

(Continued)

OTHER PUBLICATIONS

Sun, "Java Message Service" Version 1.1, Apr. 12, 2002.*

(Continued)

*Primary Examiner* — Linglan Edwards
(74) *Attorney, Agent, or Firm* — Baker Botts L.L.P.

(57) ABSTRACT

In certain embodiments, a method for transferring session state information between web applications comprises receiving control of a first session from a first web application via a second session with the first web application. The first session comprises interaction between a browser and a first web application and is associated with session state information for the first session. The method further comprises receiving from the first web application via the second session at least a portion of the session state information for the first session. The method further comprises storing, in a first message queue using a first message service, at least a portion of the session state information for the first session received from the first application, a first message key being generated for the stored session state information for the first session and stored in association with the stored session state information for the first session.

33 Claims, 12 Drawing Sheets

(56) References Cited

U.S. PATENT DOCUMENTS

| | | | |
|---|---|---|---|
| 2002/0055973 A1* | 5/2002 | Low et al. | 709/204 |
| 2002/0055974 A1* | 5/2002 | Hawkes et al. | 709/204 |
| 2002/0073211 A1* | 6/2002 | Lin | H04L 63/10 709/229 |
| 2003/0002526 A1* | 1/2003 | Dias et al. | 370/466 |
| 2003/0033118 A1* | 2/2003 | Peddanna | 702/186 |
| 2003/0105805 A1* | 6/2003 | Jorgenson | 709/203 |
| 2004/0024731 A1* | 2/2004 | Cabrera et al. | 707/1 |
| 2004/0260949 A1* | 12/2004 | Aoki et al. | 713/201 |
| 2006/0218287 A1* | 9/2006 | Dodrill | H04L 12/587 709/227 |
| 2006/0259499 A1* | 11/2006 | Moulckers et al. | 707/100 |

OTHER PUBLICATIONS

Selected pages regarding Java Message Service (JMS) J2EE, obtained from http://java.sum.com/products/jms, Last visited Aug. 3, 2007.

Selected pages regarding Java Message Service (JMS), obtained from http://java.sun.com/j2ee/1.4/docs/api/javax/jms/package-summary.html, Last visited Aug. 3, 2007.

*Notification of Transmittal of the International Search Report and the Written Opinion of the International Searching Authority, or the Declaration* Regarding International Application No. PCT/US2007/005525, Sep. 5, 2007.

*State Management in WWW Database Applications*; 1998 IEEE Article, 7 pages.

* cited by examiner

TRANSFERRING SESSION STATE INFORMATION BETWEEN TWO OR MORE WEB-BASED APPLICATIONS OF A SERVER SYSTEM

RELATED APPLICATIONS

This application claims the benefit under 35 U.S.C. §119(e) of U.S. Provisional Application No. 60/779,615, entitled, "Transferring Session State Information Between Two or More Web-Based Applications of a Server System," filed on Mar. 6, 2006.

TECHNICAL FIELD

The present invention relates generally to web-based applications and more particularly to transferring session state information between two or more web-based applications of a server system.

BACKGROUND

Web-based applications are frequently made available to one or more user systems over the Internet or another suitable network. For example, user systems may use a web browser to access one or more web-based applications that are running on a server system. Interaction between the browser and a web-based application may be considered a session, such as a hypertext transfer protocol (HTTP) session. Information about the session, which can be referred to as session state information, may be stored at the server system. Each application on the server system with which the browser interacts may be associated with its own distinct session (i.e., between that application and the browser) with its own session state information. A first web application with which the browser is interacting and for which a session is established may transfer control of the browser interaction to a second web application. This transfer may occur for any number of reasons. However, it may be difficult or impossible for the first web application to share the session state information with the second web application.

SUMMARY

According to the present invention, disadvantages and problems associated with previous techniques for transferring session state information between two or more web-based applications of a server system may be reduced or eliminated.

In certain embodiments, a method for transferring session state information between web applications comprises receiving control of a first session from a first web application via a second session with the first web application. The first session comprises interaction between a browser and a first web application and is associated with session state information for the first session. The method further comprises receiving from the first web application via the second session at least a portion of the session state information for the first session received from the first web application. The method further comprises storing, in a first message queue using a first message service, at least a portion of the session state information for the first session, a first message key being generated for the stored session state information for the first session and stored in association with the stored session state information for the first session.

In certain embodiments, a system for transferring session state information between web applications comprises a first and second web applications. The first web application is operable to interact with a browser via a first session, the first session associated with session state information for the first session, and to transfer control of the first session. The second web application is operable to receive the control of the first session from the first web application via a second session with the first web application and to receive from the first web application via the second session at least a portion of the session state information for the first session. The second web application is operable to store, in a first message queue using a first message service, at least a portion of the session state information for the first session received from the first web application, a first message key being generated for the stored session state information for the first session and stored in association with the stored session state information for the first session.

Particular embodiments of the present invention may provide one or more technical advantages. In certain embodiments, the present invention may allow session state information to be transferred between two or more web-based applications. Each interaction session between a browser and an application may have its own context, and the present invention may enable session state information to be transferred across these contexts. In certain embodiments, after control of interaction with a browser has been transferred from a first web-based application to a second web-based application, the present invention may allow control of interaction with the browser to be returned to the first web-based application, which may allow the browser to return to the last page displayed by the first web-based application before the transfer of control to the second web-based application.

In certain embodiments, the present invention may reduce or eliminate storage requirements compared to certain conventional techniques for transferring session state information between web-based applications. For example, the JAVA MESSAGE SERVICE (JMS), which may be used to store session state information in certain embodiments of the present invention, has a built-in mechanism to expire messages that are stored using the JMS, which may assist in maintaining a "clean" storage area for storing session state information. JMS may also have a mechanism for locating individual messages based on an identifier, which may allow the session that should be restored to be looked up based on an identifier that may be defined in any suitable manner.

Certain embodiments of the present invention may provide some, all, or none of the above advantages. Certain embodiments may provide one or more other technical advantages, one or more of which may be readily apparent to those skilled in the art from the figures, descriptions, and claims included herein.

BRIEF DESCRIPTION OF THE DRAWINGS

For a more complete understanding of the present invention, and for further features and advantages thereof, reference is now made to the following description, taken in conjunction with the accompanying drawings, in which.

DESCRIPTION OF EXAMPLE EMBODIMENTS

Figure 1:
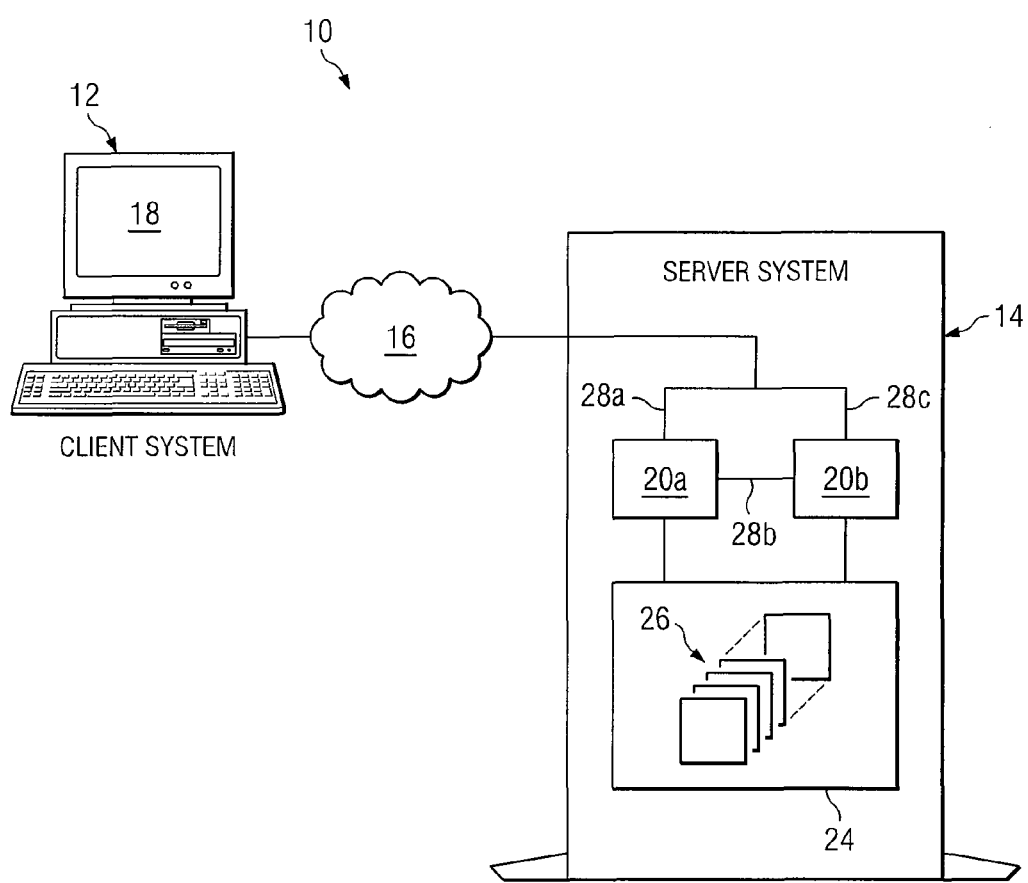
FIG. 1 illustrates an example system for transferring session state information between two or more web-based applications of a server system, according to certain embodiments of the present invention.

FIG. 1 illustrates an example system 10 for transferring session state information between two or more web-based applications of a server system, according to certain embodiments of the present invention. In certain embodiments, system 10 includes one or more user systems 12 coupled to a server system 14 via a network 16. Although this particular implement of system 10 is illustrated and described, the present invention contemplates any suitable system for implementing the present invention.

User system 12 may include input devices, output devices, mass storage media, processors, memory, interfaces, communication ports, or other appropriate components for communicating with server system 14. For example, user system 12 may include a personal computer, workstation, network computer, kiosk, wireless data port, personal data assistant (PDA), one or more Internet Protocol (IP) telephones, one or more processors within these or other devices, or any other suitable processing device. As a particular example, user system 12 may include a computer that includes an input device, such as a keypad, touch screen, mouse, or other device that can accept information, and an output device that conveys information associated with the operation of user system 12 or server system 14, including digital data, visual information, or any other suitable information. Both the input device and output device may include fixed or removable storage media such as a magnetic computer disk, CD-ROM, or other suitable media to both receive input from and provide output to a user of user system 12.

User system 12 may be local to or remote from server system 14. Although a single user system 12 is illustrated, the present invention contemplates system 10 including any suitable number of user systems 12, according to particular needs. "User system 12" and "user of user system 12" may be used interchangeably throughout this description. A user of user system 12 may include, for example, a human user or a computer program or other suitable software module for automatically interacting with user system 12.

User system 12 includes a browser 18 or other suitable interface for accessing information over network 16. For example, browser 18 may present various web-enabled data feeds and receive commands from user system 12. Browser 18 may include any suitable interface for submitting requests for and displaying media such as web pages. It should be understood that the term "browser" may be used in the singular or in the plural to describe one or more browsers and each of the displays of a particular browser. In certain embodiments, browser 18 comprises a generic web browser, such as MICROSOFT INTERNET EXPLORER, MOZILLA FIREFOX, or NETSCAPE NAVIGATOR, that processes information in system 10 and efficiently presents the information to a user of user system 12. Server system 14 may accept data over network 16 from user system 12 via browser 18 and return the appropriate HyperText Markup Language (HTML), eXtensible Markup Language (XML), or other suitable responses. User system 12 may use browser 18 to access server system 14 over an HTTP, HTTP Secure (HTTPS), or other suitable connection, following entry of a valid uniform resource locator (URL) into browser 18 for example.

Network 16 facilitates wireless or wireline communication. Network 16 may communicate, for example, IP packets, Frame Relay frames, Asynchronous Transfer Mode (ATM) cells, voice, video, data, and other suitable information between network addresses. Network 16 may include one or more local area networks (LANs), radio access networks (RANs), metropolitan area networks (MANs), wide area networks (WANs), all or a portion of the global computer network known as the Internet, and/or any other communication system or systems at one or more locations.

Server system 14 includes one or more electronic computing devices operable to receive, transmit, process, and store data associated with system 10. For example, server system 14 may include one or more general-purpose personal computers (PCs), Macintoshes, workstations, Unix-based computers, server computers, or any other suitable devices. In short, server system 14 may include any suitable combination of software, firmware, hardware, and any other suitable components.

Server system 14 may include a single server or any suitable number of servers. For example, server system may include a number of servers arranged in a server pool. In certain embodiments, server system 14 includes one or more web application servers. For example, server system 14 may include a WEBLOGIC server manufactured by BEA SYSTEMS, a WEBSPHERE server manufactured by IBM, or any other suitable type of web application server. Server system 14 may include one or more JAVA 2 Platform Enterprise Edition (J2EE) application servers or other suitable application servers.

FIG. 1 merely provides one example of computers that may be used with the invention. For example, although FIG. 1 provides one example of server system 14 that may be used with the present invention, system 10 may be implemented using computers other than servers. The present invention contemplates computers other than general purpose computers as well as computers without conventional operating systems. As used in this document, the term "computer" is intended to encompass a personal computer, workstation, network computer, a portable computing device, or any other suitable processing device. In certain embodiments, components and features of system 10 are implemented using the JAVA programming language; however, the present invention is not intended to be so limited.

Server system 14 may include one or more applications 20 operable to send and/or receive communications, which may include one or more web pages, to and from client system 12. In certain embodiments, applications 20 comprise JAVA applications. Although a particular number of applications 20 (e.g., applications 20a and 20b) are primarily described, the present invention contemplates server system 14 including any suitable number of applications 20, according to particular needs. Moreover, applications 20 of server system 14 may be located on the same or different physical servers of server system 14.

User system 12, using browser 18, may initiate an interaction session with an application 20 of server system 14. An interaction session may include an HTTP session, for example. An interaction session may involve the communication of one or more web pages from application 20 of server system 14 to browser 18, as well as receiving input and/or selections from user system 12 via browser 18. The interaction session between user system 12 (e.g., browser 18 of user system 12) and an application 20 of server system 14 may also be associated with session state information.

Session state information may include any suitable information regarding an interaction session. In certain embodiments, session state information includes any information that is unique to a particular user system 12 during a particular connection to or interaction session with an application 20 on server system 14. In a particular example, session state information may include information regarding the windows that a user of user system 12 may have open, even though the user may only have one window currently displayed on user system 12. As a particular non-limiting example, a user may be interacting with an application 20 that is a web-based "wizard" operable to guide a user through the steps of a process or task. As the user interacts with the wizard, various screens or pages may be displayed to the user. The user may enter data into a first page, click a "next" button to proceed to the next page, enter data into the next page, click "next" again, and so on. The session state information may include the pages displayed to the user, along with the data entered by the user for those pages. In certain embodiments, if a user closes browser 18 and then opens a new instance of browser 18 to interact with the same application 20 (e.g., the same web-based wizard), that would constitute a new interaction session that is associated with its own session state information.

Typically, an interaction session is specific to interaction with a particular application 20. For example, if a user is interacting with application 20a, then the interaction session is specific to the user's interaction with application 20a. However, application 20a may determine that control of interaction with user system 12 should be transferred to another application 20 of server system 14, such as application 20b. For example, applications 20a and 20b may work together during the user's interaction with server system 14 to provide suitable responses to the user's requests.

Each application 20 typically stores session state information in an HTTP or other suitable session. With prior and existing solutions, this session state information may not be transferred automatically between separately installed applications 20. For example, if application 20a transfers control of interaction with browser 18 to application 20b, the session state information associated with the interaction session between browser 18 and application 20a may be lost. As a particular example, when server system 14 comprises a Java J2EE application server, there is no built-in mechanism to maintain a single session between separately installed applications 20 (e.g., application 20a and application 20b). When browser 18 is redirected from application 20a to application 20b, a new interaction session may be created between browser 18 and application 20b, and that new interaction session may be associated with its own session state information. If and when browser 18 is redirected back to application 20a, yet another new interaction session may be created between browser 18 and application 20a, and that new interaction session may be associated with its own session state information.

Previous and existing solutions to these problems are generally inadequate or otherwise undesirable. For example, if application 20a attempts to connect directly to application 20b in order to transfer session state information to application 20b, a new session is created between application 20a and application 20b, this new session being associated with its own session state information. In this example, if application 20b stores the session state information communicated from application 20a in the current session (i.e., the session between application 20a and 20b), that stored session state information may not be available when browser 18 is redirected to application 20b because the session created between application 20a and application 20b is not the same session as the session between browser 18 and application 20b. The two sessions (i.e., the session between application 20a and application 20b and the session between browser 18 and application 20b) do not share an HTTP session and therefore do not share any session state information that is stored in the HTTP session. As another example, the SUN JAVA J2EE server includes mechanisms for persistently storing session state information in either an ENTERPRISE JAVA BEAN (EJB) or in a database. However, both the EJB and database mechanisms typically require significant overhead and are intended for long term storage only. As another example, session state information could be stored in a cookie on user system 12. However, session state information generally includes a significant amount of information, which is not suitable for storing in a cookie.

In certain embodiments, the present invention provides a technique for transferring session state information between two or more applications 20, such as two separately installed JAVA applications. In certain embodiments, application 20a may connect directly to application 20b and transfer to application 20b the session state information of the session between browser 18 and application 20a. Application 20b may store the transferred session state information as a message using a message service 24. In certain embodiments, message service 24 may comprise the JMS, and the session state information may be stored as a message in a JMS message queue 26 or JMS topic of the JMS; however, the present invention contemplates using any suitable type of message service, according to particular needs. The messages may be stored in-memory, in a persistent storage area (e.g., a database management system), or in any other suitable location. The message that includes the session state information may be identified by a unique message key. In certain embodiments, the unique message key is generated by the application 20 that is storing the session state information in message queue 26; however, the present invention contemplates the unique message key being generated in any suitable manner, according to particular needs.

Application 20b may return the message key to application 20a, and application 20a may send the message key to browser 18 and redirect browser 18 to application 20b. Application 20b may use the message key to retrieve or otherwise access the session state information from message queue 26 of message service 24. A session state determined from the session state information stored in message queue 26 of message service 24 may then be loaded by application 20b into the current HTTP session between browser 18 and application 20b.

In certain embodiments, applications 20 may be modified to use particular interfaces for interacting with the JMS or other message service 24. As just one example, applications 20 may be modified to interact with a state store interface. The state store interface may define the mechanism for storing and retrieving session state information from message service 24. The state store interface may be implemented as a State Store JMS class. In certain embodiments, the following methods may be defined for the State Store JMS class:

public void storeState(ServletRequest req, String identifier, Serializable state);

public Object retrieveState(ServletRequest req, String identifier);

For JMS configuration, hard-coded JMS factory and message queue 26 names may be defined in the State Store JMS class. As just one example, the name of message queue 26 may be jms/XContentQueue and the factory name may be jms/GenQueueFactory. These names may be mapped to Java Naming and Directory Interface (JNDI) names configured on server system 14. Each server of server system 14 may have its own mechanism for specifying this mapping. The message timeout for JMS messages may use the same value entered for a session timeout.

In operation of an example embodiment of system 10, a first session 28a may be initiated, first session 28a being between browser 18 of user system 12 and application 20a. In certain embodiments, first session 28a comprises an HTTP or HTTPS session. First session 28a may include displaying one or more web pages to browser 18, receiving one or more inputs or other selections from browser 18, or any other suitable data. First session 28a may be associated with session state information. Session state information associated with first session 28a may be stored. For example, application 20a may store the session state information associated with first session 28a in any suitable memory module, according to particular needs.

A determination may be made to transfer control of interaction with browser 18 from application 20a to application 20b. This determination may be made in any suitable manner and for any suitable reason, according to particular needs. A second session 28b may be initiated, second session 28b being between application 20a and application 20b. For example, in response to determining to transfer control of interaction with browser 18 from application 20a to application 20b, application 20a may initiate establishment of second session 28b between application 20a and application 20b. In certain embodiments, second session 28b comprises an HTTP or HTTPS session. Application 20a may communicate at least a portion of the session state information associated with first session 28a to application 20b via second session 28b.

In certain embodiments, application 20b may determine that application 20b does not need to display anything in browser 18, in which case application 20b may not store the received session state information for first session 28a; however, the present invention contemplates application 20b storing a portion or all of the received session state information in such a case. Application 20b may determine that a new page should be displayed to browser 18. Application 20b may initiate generation of a message key for storing the session state information for first session 28a. In certain embodiments, the generated message key includes an identifier of the session state information for first session 28a. As an example, the generated message key may be used to identify a message in message service 24. Application 20b may store the session state information for first session 28a received from application 20a using message service 24. For example, application 20b may store the session state information for first session 28a in message queue 26 of message service 24. As described above, message service 24 may include the JMS. The session state information for first session 28a may be stored in message service 24 using the generated message key. In certain embodiments, when the session state information for first session 28a is stored in message queue 26 of message service 24, the message key for the stored session state information may be automatically generated and stored by the application 20 that is storing the session state information (e.g., application 20b in this case).

Application 20b may notify application 20a that the new web page is available to be displayed at browser 18. This notification may be communicated via second session 28b between applications 20a and 20b. In certain embodiments, the notification includes a URL of the new web page and the message key associated with the stored session state information for first session 28a. The message key may be included in the URL as a parameter of the URL, although the present invention contemplates the message key being communicated to application 20a in any suitable manner. Application 20a may receive the notification from application 20b that the new web page is available, the notification including the message key. Application 20a may communicate a notification to browser 18, via first session 28a for example, that the new web page is available for display. In certain embodiments, the notification comprises the URL of the new web page and the message key. The message key may be included as a parameter of the URL, although the present invention contemplates the message key being communicated to application 20a in any suitable manner. In certain embodiments, the notification (e.g., the URL) directs browser 18 to application 20b for retrieval of the new web page.

A third session 28c may be initiated, third session 28c being between browser 18 and application 20b, in response to the notification browser 18 receives from application 20a for example. In certain embodiments, user system 12 may access, using browser 18, application 20b on server system 14 by entering, either automatically or with user interaction, the URL included in the notification into browser 18. The message key included in the notification may be included with the request for the new page, as a parameter of the URL for example. In certain embodiments, third session 28c comprises an HTTP or HTTPS session. Application 20b may receive the request for the new page from browser 18 and may use the message key included in the request to retrieve or otherwise access at least a portion of the stored session state information for first session 28a from message service 24. For example, application 20b may retrieve or otherwise access at least a portion of the stored session state information for first session 28a from message queue 26 of the JMS based on the message key. Application 20b may retrieve the new web page, using the retrieved session state information if appropriate. The present invention contemplates application 20b performing any suitable processing prior to retrieving the new web page. As just one example, this processing may include performing work to determine which page to communicate to browser 18. Application 20b may communicate the new web page to browser 18 for display, via third session 28c for example.

Particular embodiments of the present invention may provide one or more technical advantages. In certain embodiments, the present invention may allow session state information to be transferred between two or more web-based applications 20. Each interaction session between browser 18 and an application 20 may have its own context, and the present invention may enable session state information to be transferred across these contexts. In certain embodiments, after control of interaction with browser 18 has been transferred from a first web-based application 20a to a second web-based application 20b, the present invention may allow control of interaction with browser 18 to be returned to first web-based application 20a, which may allow browser 18 to return to the last page displayed by first web-based application 20a before the transfer of control to second web-based application 20b.

In certain embodiments, the present invention may reduce or eliminate storage requirements compared to certain conventional techniques for transferring session state information between web-based applications 20. For example, the JMS, which may be used to store session state information in certain embodiments of the present invention, has a built-in mechanism to expire messages that are stored using the JMS, which may assist in maintaining a "clean" storage area for storing session state information. JMS may also have a mechanism for locating individual messages based on an identifier, which may allow the session that should be restored to be looked up based on an identifier that may be defined in any suitable manner.

Figure 2:
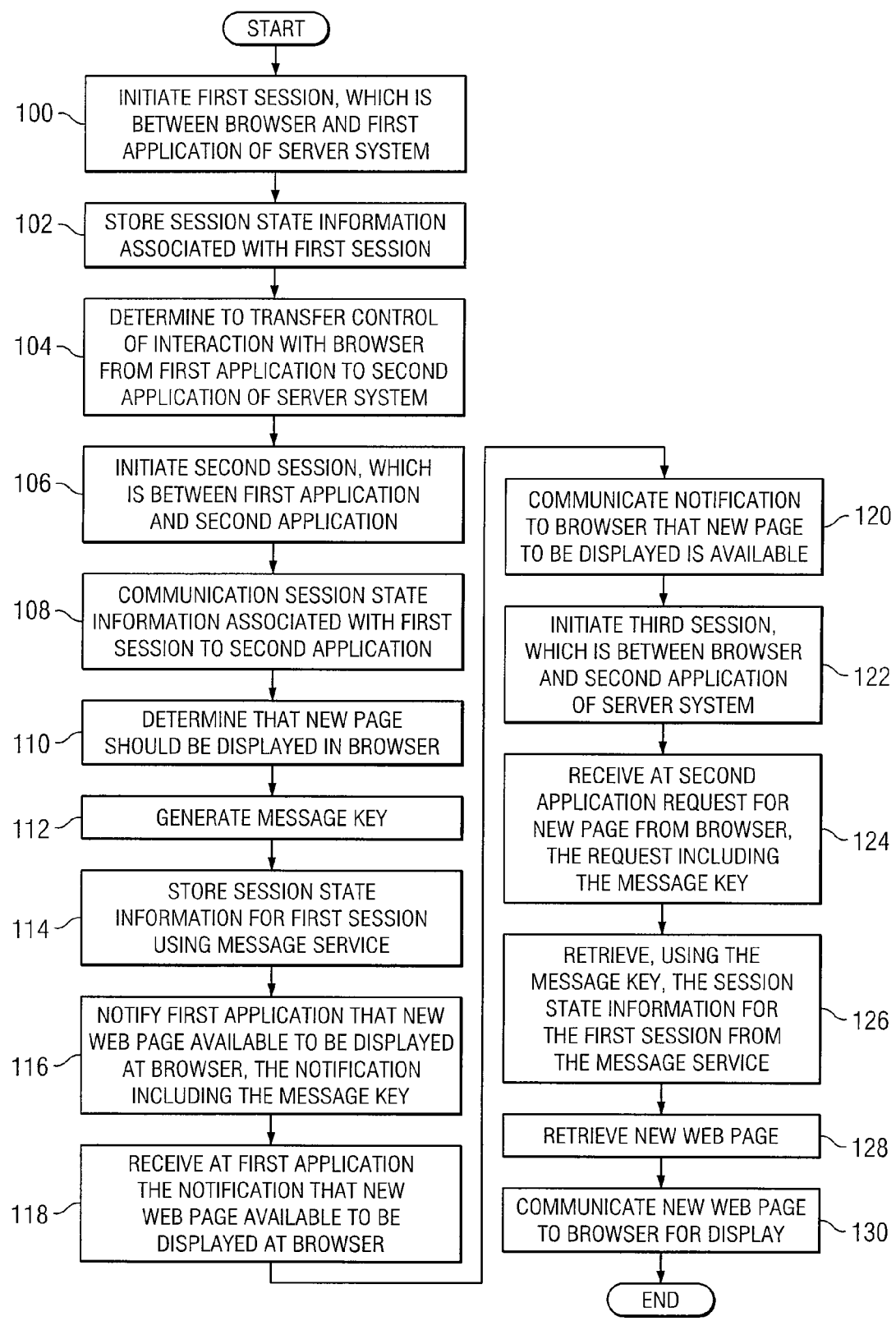
FIG. 2 illustrates an example method for transferring session state information between two or more web-based applications on a server system, according to certain embodiments of the present invention.

FIG. 2 illustrates an example method for transferring session state information between two or more web-based applications 20 on a server system 14, according to certain embodiments of the present invention. The method described with reference to FIG. 2 is described using two applications 20, applications 20a and 20b, for example purposes only.

At step 100, a first session 28a may be initiated, first session 28a being between browser 18 of user system 12 and application 20a. For example, a user system 12 may access, using browser 18, application 20a on server system 14 by entering an appropriate URL into browser 18. In certain embodiments, first session 28a comprises an HTTP or HTTPS session. First session 28a may include displaying one or more web pages to browser 18, receiving one or more inputs or other selections from browser 18, or any other suitable data. First session 28a may be associated with session state information. At step 102, session state information associated with first session 28a may be stored. For example, application 20a may store the session state information associated with first session 28a in any suitable memory module, according to particular needs.

At step 104, a determination is made to transfer control of interaction with browser 18 from application 20a to application 20b. This determination may be made in any suitable manner and for any suitable reason, according to particular needs. As just one example, application 20a may determine to transfer control to application 20b based on certain selections made by user system 12 via browser 18. At step 106, a second session 28b may be initiated, second session 28b being between application 20a and application 20b. For example, in response to determining to transfer control of interaction with browser 18 from application 20a to application 20b, application 20a may initiate establishment of second session 28b between application 20a and application 20b. In certain embodiments, second session 28b between application 20a and application 20b comprises an HTTP or HTTPS session. At step 108, application 20a communicates at least a portion of the session state information associated with first session 28a to application 20b via second session 28b.

At step 110, application 20b determines that a new page should be displayed to browser 18. In certain embodiments, application 20b may determine that application 20b does not need to display anything in browser 18, in which case application 20b may not store the received session state information for first session 28a; however, the present invention contemplates application 20b storing a portion or all of the received session state information in such a case. At step 112, application 20b initiates generation of a message key for storing the session state information for first session 28a. In certain embodiments, the generated message key includes an identifier of the session state information for first session 28a. As an example, the generated message key may be used to identify a message in message service 24.

At step 114, application 20b stores the session state information for first session 28a received from application 20a using message service 24. For example, application 20b may store the session state information for first session 28a in message queue 26 of message service 24. As described above, message service 24 may include the JMS. The session state information for first session 28a may be stored in message service 24 using the message key generated at step 112. In certain embodiments, steps 112-114 may be performed as essentially a single step. For example, in certain embodiments, when the session state information for first session 28a is stored in message queue 26 of message service 24, a message key for the stored session state information may be automatically generated and stored by the application 20 that is storing the session state information (e.g., application 20b in this case).

At step 116, application 20b may notify application 20a that the new web page is available to be displayed at browser 18. This notification may be communicated via second session 28b between applications 20a and 20b. In certain embodiments, the notification includes a URL of the new web page and the message key associated with the stored session state information for first session 28a. The message key may be included in the URL as a parameter of the URL, although the present invention contemplates the message key being communicated to application 20a in any suitable manner. At step 118, application 20a receives the notification from application 20b that the new web page is available, the notification including the message key. At step 120, application 20a communicates a notification to browser 18, via first session 28a for example, that the new web page is available for display. In certain embodiments, the notification comprises the URL of the new web page and the message key. The message key may be included as a parameter of the URL, although the present invention contemplates the message key being communicated to application 20a in any suitable manner. In certain embodiments, the notification (e.g., the URL) directs browser 18 to application 20b for retrieval of the new web page.

At step 122, a third session 28c may be initiated, the third session being between browser 18 and application 20b. For example, a user system 12 may access, using browser 18, application 20b on server system 14 by entering, either automatically or with user interaction, the URL included in the notification into browser 18. The message key included in the notification may be included with the request for the new page, as a parameter of the URL for example. In certain embodiments, third session 28c comprises an HTTP or HTTPS session. At step 124, application 20b receives the request for the new page from browser 18. At step 126, application 20b uses the message key included in the request to retrieve or otherwise access at least a portion of the stored session state information for first session 28a from message service 24. For example, application 20b may retrieve or otherwise access at least a portion of the stored session state information for first session 28a from message queue 26 of the JMS based on the message key. At step 128, application 20b retrieves the new web page, using the retrieved session state information if appropriate. The present invention contemplates application 20b performing any suitable processing prior to retrieving the new web page. As just one example, this processing may include performing work to determine which page to communicate to browser 18. At step 130, application 20b communicates the new web page to browser 18 for display, via third session 28c for example.

Typically, with a web application, there is no concept of a return. For example, if a browser proceeds from one page to the next page and if the user wants to go back to a previous page, the browser actually just flows forward again, requesting the previous page anew. In certain embodiments of the present invention, however, once application 20b has completed its processing (e.g., completed third session 28c), browser 18 may actually return to a web page associated with first session 28a with application 20a. For example, the present invention contemplates performing the above-described method in reverse.

In certain embodiments, application 20b is operable to store session state information for third session 28c. Application 20b may return control of interaction with browser 18 to application 20a and communicate to application 20a via second session 28b at least a portion of the session state information for the third session. Application 20a may be operable to receive from application 20b via second session 28b portion of the session state information for third session 28c and store, in message queue 26 using message service 24, at least a portion of the session state information for third session 28c received from application 20b. A message key being generated for the stored session state information for third session 28c and stored in association with the stored session state information for third session 28c. Application 20a may be operable to determine to display a second new web page in browser 18. In certain embodiments, this second new web page is the last page displayed by application 20a during the first session 28a. Application 20a may receive from browser 18 via first session 28a a request for the second new web page, the request for the second new web page comprising the message key for the stored session state information for third session 28c. Application 20a may retrieve, based on the message key for the stored session state information for third session 28c, at least a portion of the session state information for third session 28c from message service and communicate the second new web page to browser 18 for display.

Although a single message service 24 and a single message queue 26 have been primarily illustrated and described, the present invention contemplates applications 20 using any suitable number of different message services 24 and message queues 26, according to particular needs. In certain embodiments, applications 20a and 20b may each use their own message service 24 and message queue 26. For example, applications 20a and 20b may each use their own message service 24 and message queue 26 when applications 20a and 20b are located on physically distinct servers; however, the present invention contemplates applications 20a and 20b using the same message service 24 and message queue 26 when applications 20a and 20b are located on physically distinct servers, if appropriate.

As just one particular example, application 20b may store at least a portion of the session state information for the first session received from application 20a in a first message queue 26 using a first message service 24. Application 20b may generate a first message key for this stored session state information. Continuing with this example, application 20a may store at least a portion of the session state information for the third session received from application 20b in a second message queue 26 using a second message service 24. Application 20a may generate a second message key for this stored session state information. Alternatively, applications 20a and 20b may use multiple message queues 26 associated with a single message service 24 or may use a single message queue 26 that is accessible to multiple message services 24.

Although a particular method for transferring session state information between two or more web-based applications 20 of a server system 14 has been described with reference to FIG. 2, the present invention contemplates any suitable method for transferring session state information between two or more web-based applications 20 of a server system 14 in accordance with the present description. Thus, certain of the steps described with reference to FIG. 2 may take place simultaneously and/or in different orders than as shown. Moreover, components of system 10 may use methods with additional steps, fewer steps, and/or different steps, so long as the steps remain appropriate.

FIGS. 3A-3J illustrate an example control flow for transferring session state information between two or more web-based applications 20, according to certain embodiments of the present invention. The control flow described with reference to FIGS. 3A-3J is described using two applications 20, applications 20a and 20b, for example purposes only. As described above, applications 20a and 20b may run on one or more server systems 14.

Figure 3A:
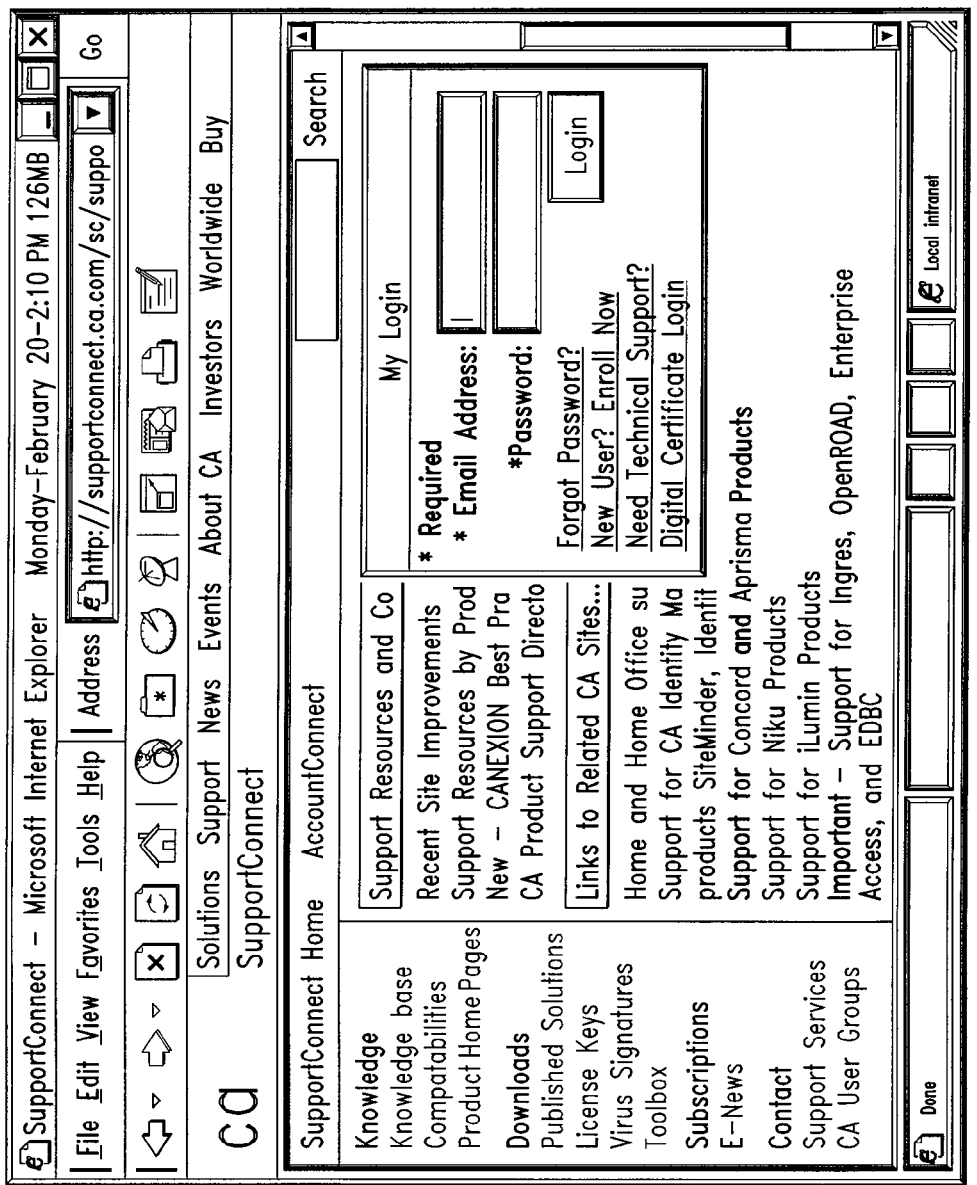
FIGS. 3A-3J illustrate an example control flow for transferring session state information between two or more web-based applications, according to certain embodiments of the present invention.

As shown in FIG. 3A, a first session 28a may be initiated, first session 28a being between browser 18 of user system 12 and application 20a. For example, user system 12 may access, using browser 18, application 20a on server system 14 by entering an appropriate URL into browser 18. In certain embodiments, first session 28a comprises an HTTP or HTTPS session. First session 28a may include displaying one or more web pages to browser 18, receiving one or more inputs or other selections from browser 18, or any other suitable data. First session 28a may be associated with session state information. The session state information associated with first session 28a may be stored. For example, application 20a may store the session state information associated with first session 28a in any suitable memory module, according to particular needs.

Figure 3B:
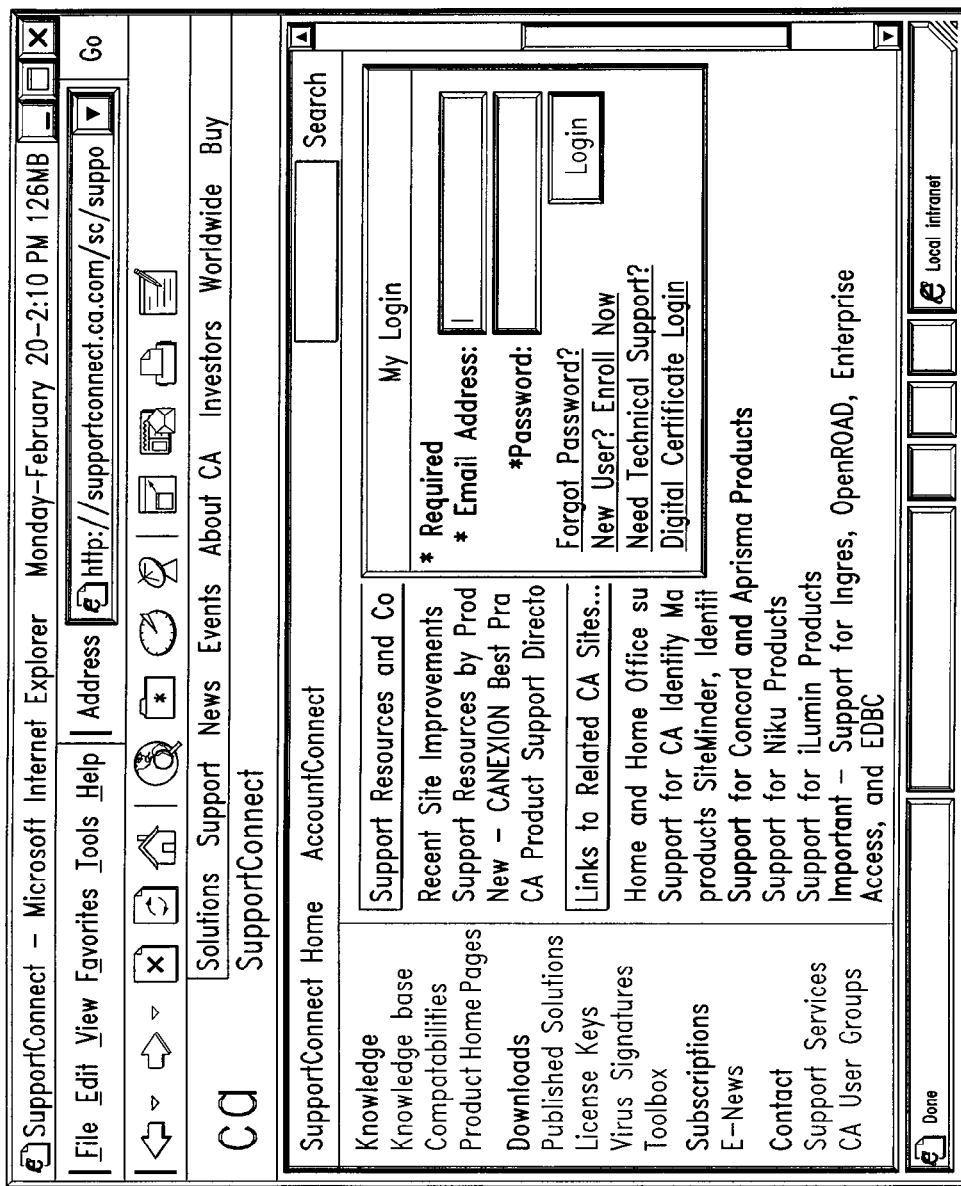

In FIG. 3B, a determination is made to transfer control of interaction with browser 18 from application 20a to another application (i.e., application 20b). This determination may be made in any suitable manner and for any suitable reason, according to particular needs. As just one example, application 20a may determine to transfer control to application 20b based on certain selections made by user system 12 via browser 18.

Figure 3C:
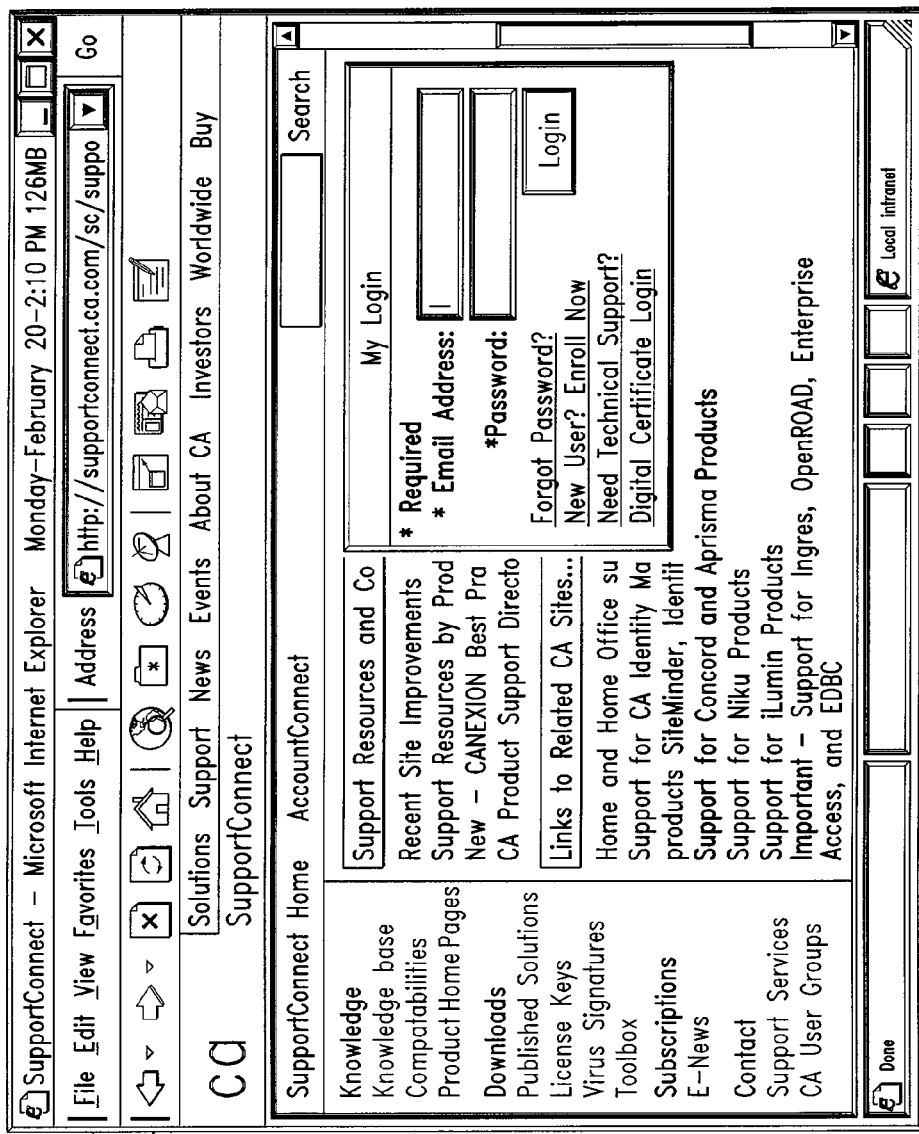
Figure 3C:
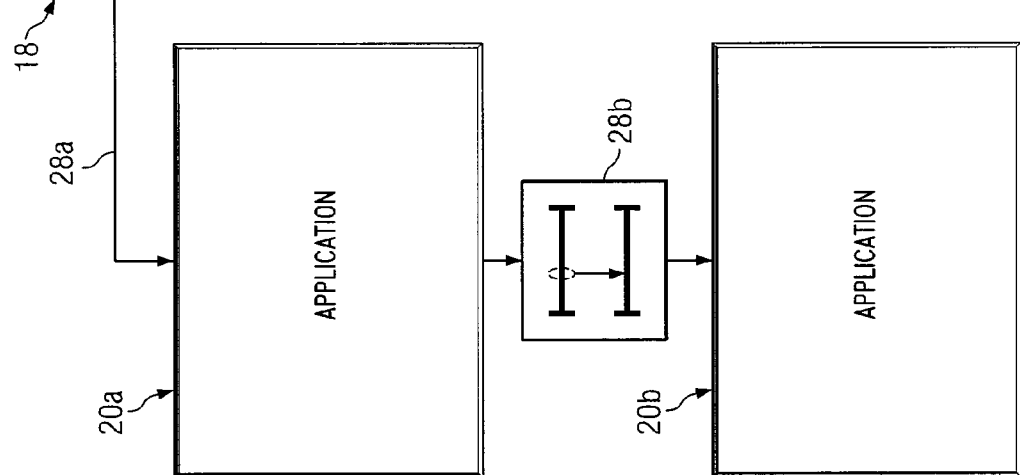

As shown in FIG. 3C, a second session 28b may be initiated, second session 28b being between application 20a and application 20b. For example, in response to determining to transfer control of interaction with browser 18 from application 20a to application 20b, application 20a may initiate establishment of second session 28b between application 20a and application 20b. In certain embodiments, second session 28b between application 20a and application 20b comprises an HTTP or HTTPS session. At step 108, application 20a communicates at least a portion of the session state information associated with first session 28a to application 20b via second session 28b.

Figure 3D:
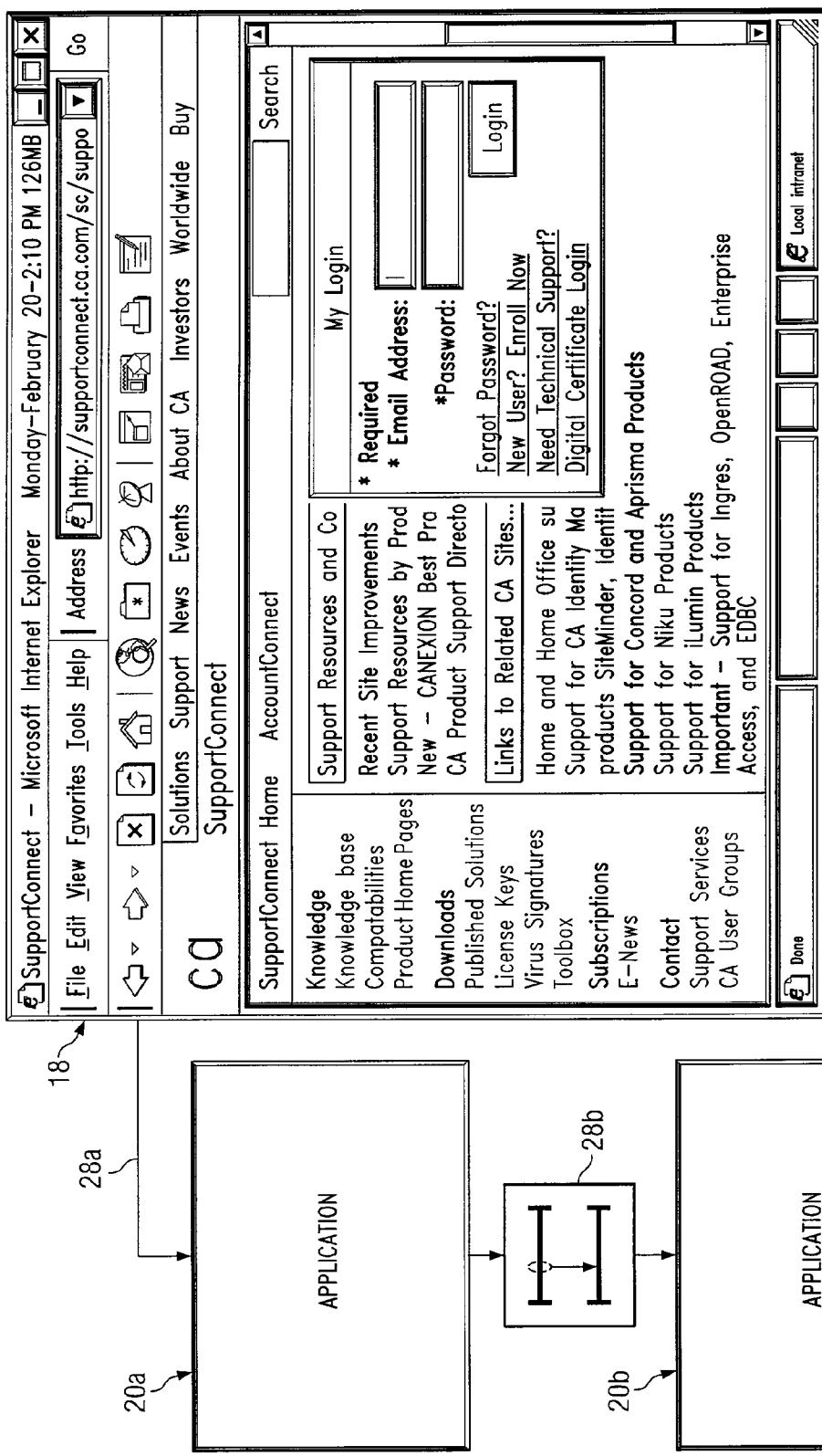

In FIG. 3D, application 20b determines that a new page should be displayed to browser 18. In certain embodiments, application 20b may determine that application 20b does not need to display anything in browser 18, in which case application 20b may not store the received session state information for first session 28a; however, the present invention contemplates application 20b storing a portion or all of the received session state information in such a case.

Figure 3E:
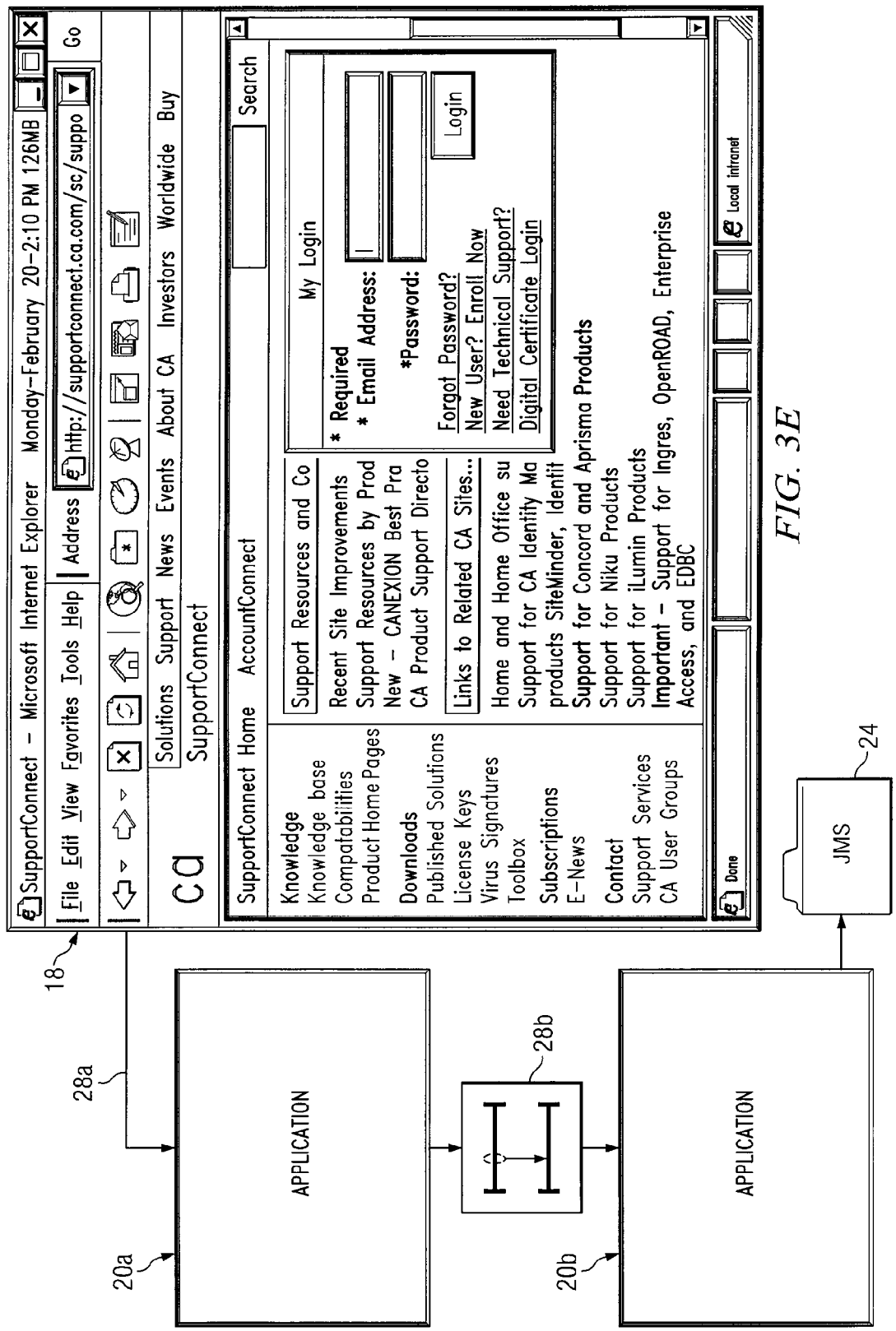

As shown in FIG. 3E, application 20b initiates generation of a message key for storing the session state information for first session 28a. The session state information may include, for example, information to be used when browser 18 requests the new web page. In certain embodiments, the generated message key includes an identifier of the session state information for first session 28a. As an example, the generated message key may be used to identify a message in message service 24. Application 20b stores the session state information for first session 28a received from application 20a using message service 24. For example, application 20b may store the session state information for first session 28a in message queue 26 of message service 24. As described above, message service 24 may include the JMS. The session state information for first session 28a may be stored in message service 24 using the generated message key. In certain embodiments, when the session state information for first session 28a is stored in message queue 26 of message service 24, a message key for the stored session state information may be automatically generated and stored by the application 20 that is storing the session state information (e.g., application 20b in this case).

Figure 3F:
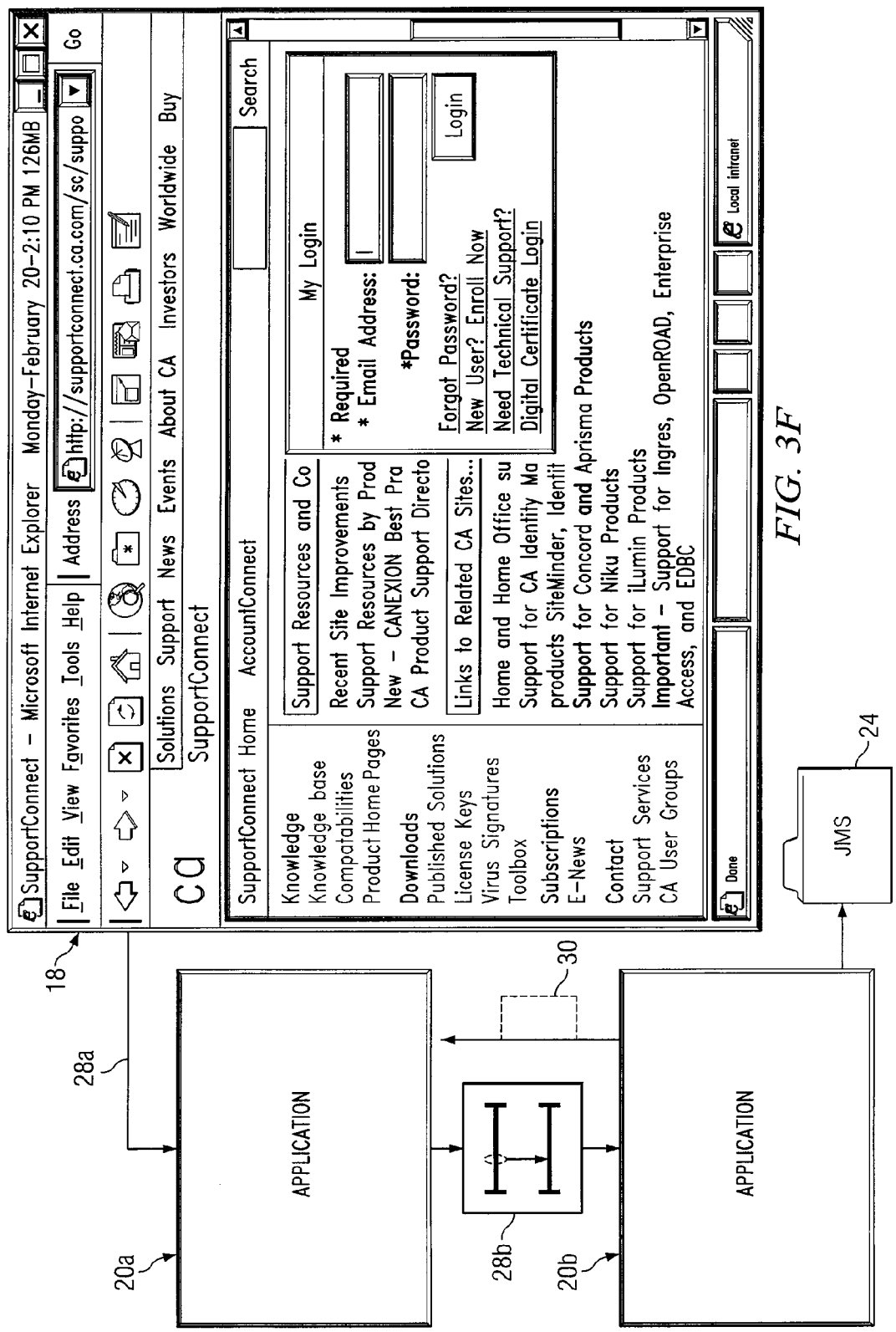

As shown in FIG. 3F, application 20b may notify application 20a that the new web page is available to be displayed at browser 18. This notification 30 may be communicated via second session 28b between applications 20a and 20b. In certain embodiments, notification 30 includes a URL of the new web page and the message key associated with the stored session state information for first session 28a. The message key may be included in the URL as a parameter of the URL, although the present invention contemplates the message key being communicated to application 20a in any suitable manner. Application 20a may receive notification 30 from application 20b that the new web page is available, notification 30 including the message key.

Figure 3G:
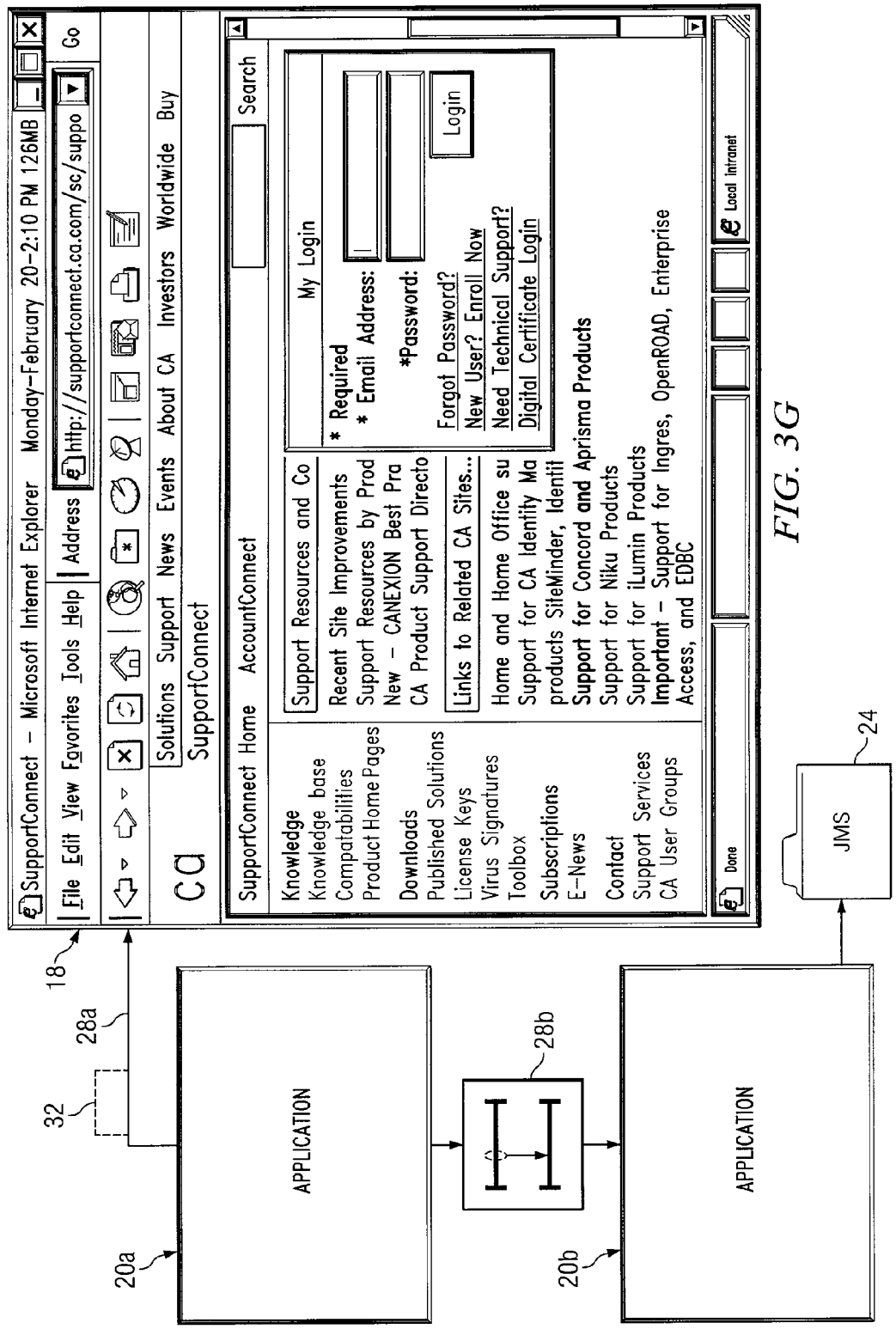

As shown in FIG. 3G, application 20a communicates a notification 32 to browser 18, via first session 28a for example, that the new web page is available for display. In certain embodiments, notification 32 comprises the URL of the new web page and the message key. The message key may be included as a parameter of the URL, although the present invention contemplates the message key being communicated to application 20a in any suitable manner. In certain embodiments, notification 32 (e.g., the URL) directs browser 18 to application 20b for retrieval of the new web page.

Figure 3H:
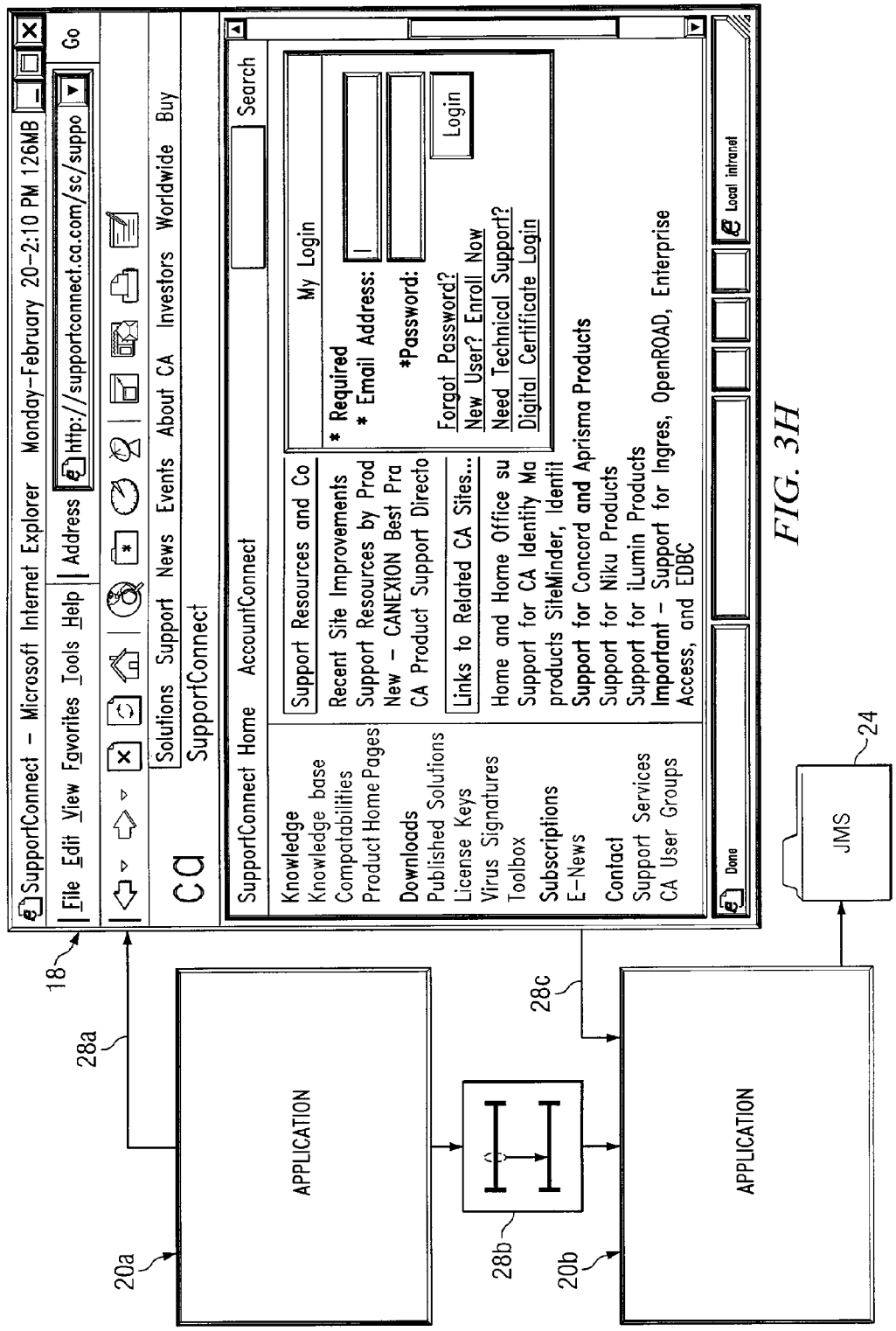

As shown in FIG. 3H, a third session 28c may be initiated, the third session being between browser 18 and application 20b. For example, a user system 12 may access, using browser 18, application 20b on server system 14 by entering, either automatically or with user interaction, the URL included in the notification into browser 18. The message key included in the notification may be included with the request for the new page, as a parameter of the URL for example. In certain embodiments, third session 28c comprises an HTTP or HTTPS session.

Figure 3I:
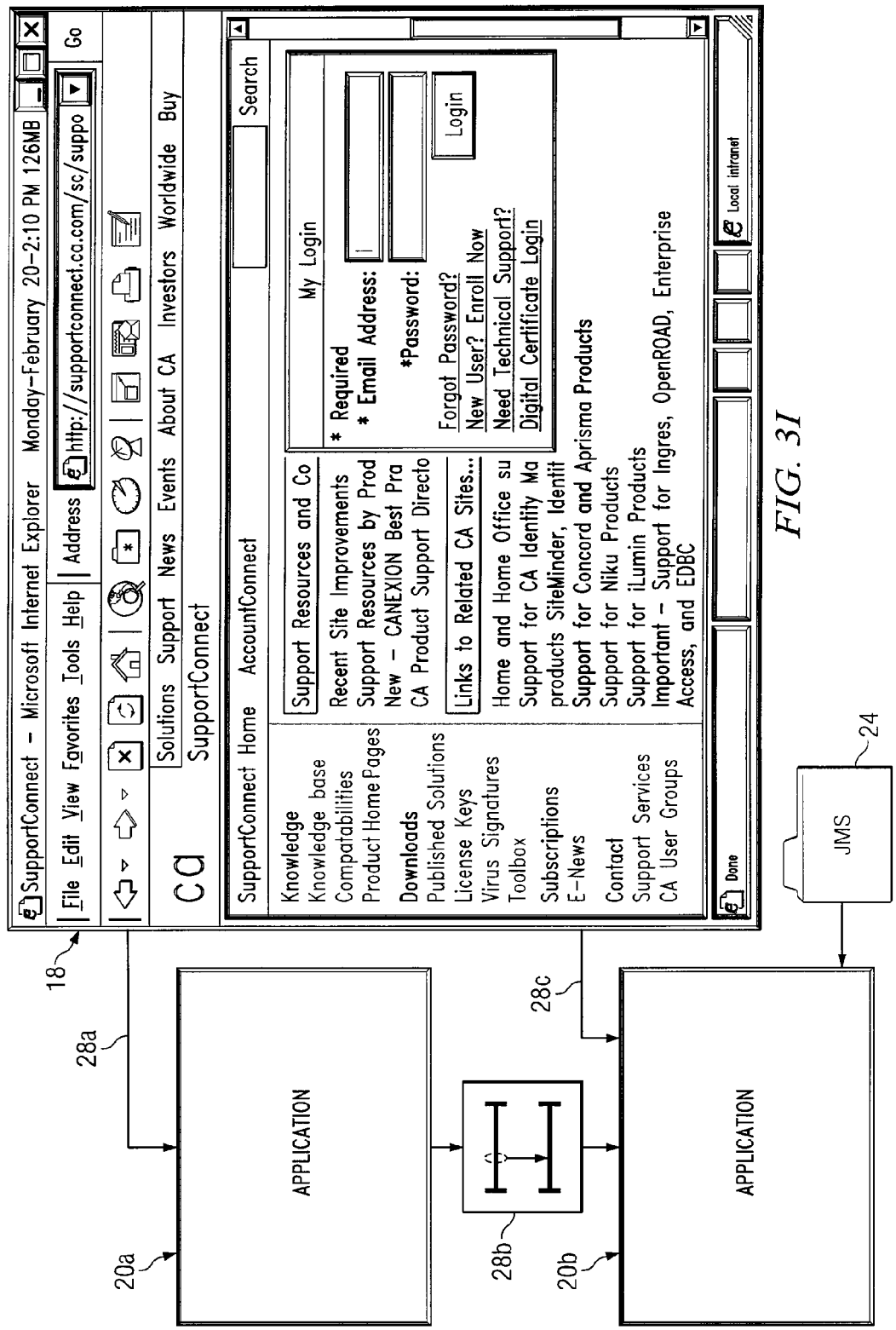
Figure 3J:
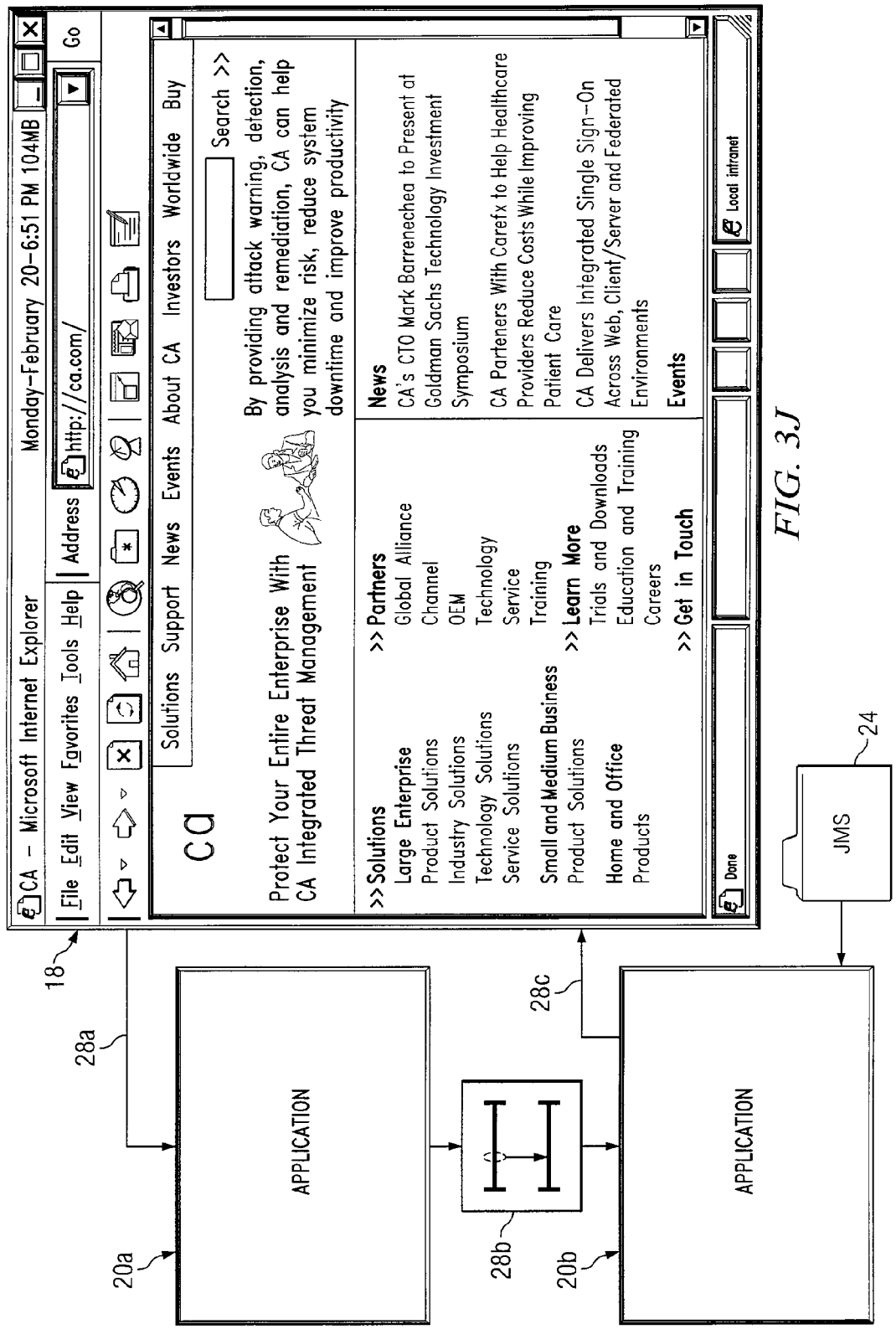

In FIG. 3I, application 20b receives the request for the new page from browser 18. Application 20b may use the message key included in the request to retrieve or otherwise access at least a portion of the stored session state information for first session 28a from message service 24. For example, application 20b may retrieve or otherwise access at least a portion of the stored session state information for first session 28a from message queue 26 of the JMS based on the message key. Application 20b may retrieve the new web page, using the retrieved session state information if appropriate. The present invention contemplates application 20b performing any suitable processing prior to retrieving the new web page. As just one example, this processing may include performing work to determine which page to communicate to browser 18. As shown in FIG. 3J, application 20b may communicate the new web page to browser 18 for display, via third session 28c for example.

Although the present invention has been described in several embodiments, diverse changes, substitutions, variations, alterations, and modifications may be suggested to one skilled in the art, and it is intended that the invention may encompass all such changes, substitutions, variations, alterations, and modifications falling within the spirit and scope of the appended claims.

What is claimed is:

1. A system for transferring session state information between web applications, comprising:
one or more computing devices operable to execute:
a first web application operable to:
interact with a browser via a first session, the first session associated with session state information for the first session; and
transfer control of the first session; and
a second web application operable to:
receive the control of the first session from the first web application via a second session with the first web application;
receive from the first web application via the second session at least a portion of the session state information for the first session;
initiate, in response to receiving from the first web application via the second session the at least a portion of the session state information for the first session, generation of a first message key for the session state information for the first session received from the first web application; and
store, in a first message queue using a first message service, at least a portion of the session state information for the first session received from the first web application, the first message key for the stored session state information for the first session being stored in association with the stored session state information for the first session.

2. The system of claim 1, wherein:
the second web application is operable to:
determine to display a new web page in the browser; and
notify the first web application via the second session that the new web page is available; and
the first web application is operable to communicate via the first session a notification to the browser that the new web page is available, the notification comprising the first message key.

3. The system of claim 2, wherein the second web application is operable to:
receive from the browser via a third session a request for the new web page, the request comprising the first message key;
retrieve, based on the first message key, the session state information stored in the first message queue from the first message queue using the first message service; and
communicate via the third session the new web page to the browser for display.

4. The system of claim 3, wherein:
the second web application is operable to:
store session state information for the third session; and
return control of interaction with the browser to the first web application; and
the first web application is operable to:
receive from the second web application via the second session at least a portion of the session state information for the third session; and
store, in a second message queue using a second message service, at least a portion of the session state information for the third session received from the second application, a second message key being generated for the stored session state information for the third session and stored in association with the stored session state information for the third session.

5. The system of claim 4, wherein the first web application is operable to:
   determine to display a second new web page in the browser;
   receive from the browser via the first session a request for the second new web page, the request for the second new web page comprising the second message key;
   retrieve, based on the second message key, the session state information stored in the second message queue from the second message queue using the second message service; and
   communicate the second new web page to the browser for display.

6. The system of claim 4, wherein one or more of the following is true:
   the first message queue and the second message queue comprise the same message queue; and
   the first message service and the second message service comprise the same message service.

7. The system of claim 1, wherein the first web application and the second web application are associated with distinct application servers.

8. The system of claim 1, wherein the message service comprises a Java Message Service (JMS).

9. The system of claim 1, wherein one or more of the first and second web applications comprise JAVA applications.

10. The system of claim 1, wherein one or more of the first and second sessions comprise a hypertext transfer protocol (HTTP) session.

11. The system of claim 1, wherein the notification communicated to the browser comprises a uniform resource locator (URL) of the new web page, the URL comprising the first message key.

12. A method for transferring session state information between web applications, comprising:
   receiving control of a first session from a first web application via a second session with the first web application, the first session comprising interaction between a browser and a first web application and being associated with session state information for the first session;
   receiving from the first web application via the second session at least a portion of the session state information for the first session;
   initiating, in response to receiving from the first web application via the second session the at least a portion of the session state information for the first session, generation of a first message key for the session state information for the first session received from the first web application; and
   storing, in a first message queue using a first message service, at least a portion of the session state information for the first session received from the first web application, the first message key for the stored session state information for the first session being stored in association with the stored session state information for the first session.

13. The method of claim 12, comprising:
   determining to display a new web page in the browser; and
   notifying the first web application via the second session that the new web page is available, the first web application operable to communicate via the first session a notification to the browser that the new web page is available, the notification comprising the first message key.

14. The method of claim 13, comprising:
   receiving from the browser via a third session a request for the new web page, the request comprising the first message key;
   retrieving, based on the first message key, the session state information stored in the first message queue from the first message queue using the first message service; and
   communicating via the third session the new web page to the browser for display.

15. The method of claim 14, wherein:
   the method comprises:
      storing session state information for the third session; and
      returning control of interaction with the browser to the first web application; and
   the first web application operable to:
      receive from the second web application via the second session at least a portion of the session state information for the third session; and
      store, in a second message queue using a second message service, at least a portion of the session state information for the third session received from the second application, a second message key being generated for the stored session state information for the third session and stored in association with the stored session state information for the third session.

16. The method of claim 15, wherein the first web application is operable to:
   determine to display a second new web page in the browser;
   receive from the browser via the first session a request for the second new web page, the request for the second new web page comprising the second message key;
   retrieve, based on the second message key, the session state information stored in the second message queue from the second message queue using the second message service; and
   communicate the second new web page to the browser for display.

17. The method of claim 15, wherein one or more of the following is true:
   the first message queue and the second message queue comprise the same queue; and
   the first message service and the second message service comprise the same message service.

18. The method of claim 12, wherein the first web application and the second web application are associated with distinct application servers.

19. The method of claim 12, wherein the message service comprises a Java Message Service (JMS).

20. The method of claim 12, wherein one or more of the first and second web applications comprise JAVA applications.

21. The method of claim 12, wherein one or more of the first and second sessions comprise a hypertext transfer protocol (HTTP) session.

22. The method of claim 12, wherein the notification communicated to the browser comprises a uniform resource locator (URL) of the new web page, the URL comprising the first message key.

23. A non-transitory computer-readable storage medium encoded with software for transferring session state information between web applications, the software when executed operable to:

receive control of a first session from a first web application via a second session with the first web application, the first session comprising interaction between a browser and a first web application and being associated with session state information for the first session;

receive from the first web application via the second session at least a portion of the session state information for the first session;

initiate, in response to receiving from the first web application via the second session the at least a portion of the session state information for the first session, generation of a first message key for the session state information for the first session received from the first web application; and store, in a first message queue using a first message service, at least a portion of the session state information for the first session received from the first web application, the first message key for the stored session state information for the first session being stored in association with the stored session state information for the first session.

24. The non-transitory computer-readable storage medium of claim 23, wherein the software when executed is operable to:

determine to display a new web page in the browser; and notify the first web application via the second session that the new web page is available, the first web application operable to communicate via the first session a notification to the browser that the new web page is available, the notification comprising the first message key.

25. The non-transitory computer-readable storage medium of claim 24, wherein the software when executed is operable to:

receive from the browser via a third session a request for the new web page, the request comprising the first message key;

retrieve, based on the first message key, the session state information stored in the first message queue from the first message queue using the first message service; and communicate via the third session the new web page to the browser for display.

26. The non-transitory computer-readable storage medium of claim 25, wherein:

the software when executed is operable to:

store session state information for the third session; and return control of interaction with the browser to the first web application; and the first web application operable to:

receive from the second web application via the second session at least a portion of the session state information for the third session; and store, in a second message queue using a second message service, at least a portion of the session state information for the third session received from the second application, a second message key being generated for the stored session state information for the third session and stored in association with the stored session state information for the third session.

27. The non-transitory computer-readable storage medium of claim 26, wherein the first web application is operable to:

determine to display a second new web page in the browser;

receive from the browser via the first session a request for the second new web page, the request for the second new web page comprising the second message key;

retrieve, based on the second message key, the session state information stored in the second message queue from the second message queue using the second message service; and communicate the second new web page to the browser for display.

28. The non-transitory computer-readable storage medium of claim 26, wherein one or more of the following is true:

the first message queue and the second message queue comprise the same queue; and the first message service and the second message service comprise the same message service.

29. The non-transitory computer-readable storage medium of claim 23, wherein the first web application and the second web application are associated with distinct application servers.

30. The non-transitory computer-readable storage medium of claim 23, wherein the message service comprises a Java Message Service (JMS).

31. The non-transitory computer-readable storage medium of claim 23, wherein one or more of the first and second web applications comprise JAVA applications.

32. The non-transitory computer-readable storage medium of claim 23, wherein one or more of the first and second sessions comprise a hypertext transfer protocol (HTTP) session.

33. The non-transitory computer-readable storage medium of claim 23, wherein the notification communicated to the browser comprises a uniform resource locator (URL) of the new web page, the URL comprising the first message key.

* * * * *